United States Patent
Hill

[19]

[11] Patent Number: 5,666,218
[45] Date of Patent: Sep. 9, 1997

[54] GENERALIZED CONNECTION NETWORK

[75] Inventor: Alan Michael Hill, Woodbridge, England

[73] Assignee: British Telecommunications public limited company, London, England

[21] Appl. No.: 852,192

[22] PCT Filed: Nov. 8, 1990

[86] PCT No.: PCT/GB90/01717

§ 371 Date: May 29, 1992

§ 102(e) Date: May 29, 1992

[87] PCT Pub. No.: WO91/07854

PCT Pub. Date: May 30, 1991

[30] Foreign Application Priority Data

Nov. 10, 1989 [GB] United Kingdom ............. 8925454

[51] Int. Cl.$^6$ ............................................. H04J 14/00
[52] U.S. Cl. .................................... 359/139; 359/117
[58] Field of Search .............................. 359/114, 115, 359/117, 124, 126, 128, 139; 385/17

[56] References Cited

U.S. PATENT DOCUMENTS

| | | | |
|---|---|---|---|
| 4,731,878 | 3/1988 | Uaidya | 359/117 |
| 4,932,735 | 6/1990 | Koai | 385/17 |
| 4,991,171 | 2/1991 | Teraslinna et al. | 370/94.1 |
| 5,010,542 | 4/1991 | Pfaff | 385/17 |
| 5,018,129 | 5/1991 | Netravali et al. | 359/115 |

OTHER PUBLICATIONS

Proceedings, International Switching Symposium 1987, 15–20 Mar. 1987, vol. 3, pp. 681–68. Phoenix (US) A.M. Hill: "Switching and Distribution Networks for Wideband Optical Signals ".

Electronics And Communications In Japan. vol. 58–A. No. 1, 1975, New york US p 51–57; S. Sakata et al.: "Synthesis of Multiconnected Switching Networks".

IEEE Transactions On computers. vol. c–23, No. 3, Mar. 1974, New York US pp. 309–318; T–Y. Feng: "Data Manipulating Functions in Parallel Processors and Their Implementations".

Computer vol. 20, No. 6, Jun. 1987, Long Beach US pp. 30–40; V. P. Kumar et al.:"Augmented Shuffle–Exchange Multistage Interconnection Networks".

IEEE Transactions On computers. vol. c–27, No. 12, Dec. 1978, New York US pp. 1119–1125; C.D. Thompson: "Generalized Connection Network for Parallel Processor Intercommunication".

Ogiwara et al., Optical Waveguide Switch (3 +3) for an optical switching system Apr. 1978 (350/117).

Fujii, Low–Loss 4 +4 optical Matrix Switch for Fibre–Optic Communication. May 1979 359/117.

*Primary Examiner*—Wellington Chin
*Assistant Examiner*—Rafael Bacares
*Attorney, Agent, or Firm*—Nixon & Vanderhye P.C.

[57] ABSTRACT

A generalized connection network includes a first and second sub-network interconnected by a branching circuit having N inputs and N outputs. The branching circuit has N, two-state branching elements interconnected so as to be able to replicate a signal coupled to any one of the inputs to each of up to N outputs. The cyclic connection scheme provided by an additional two-state switch permits a net reduction in the total number of two-state switches necessary to form a generalized connection network.

7 Claims, 4 Drawing Sheets

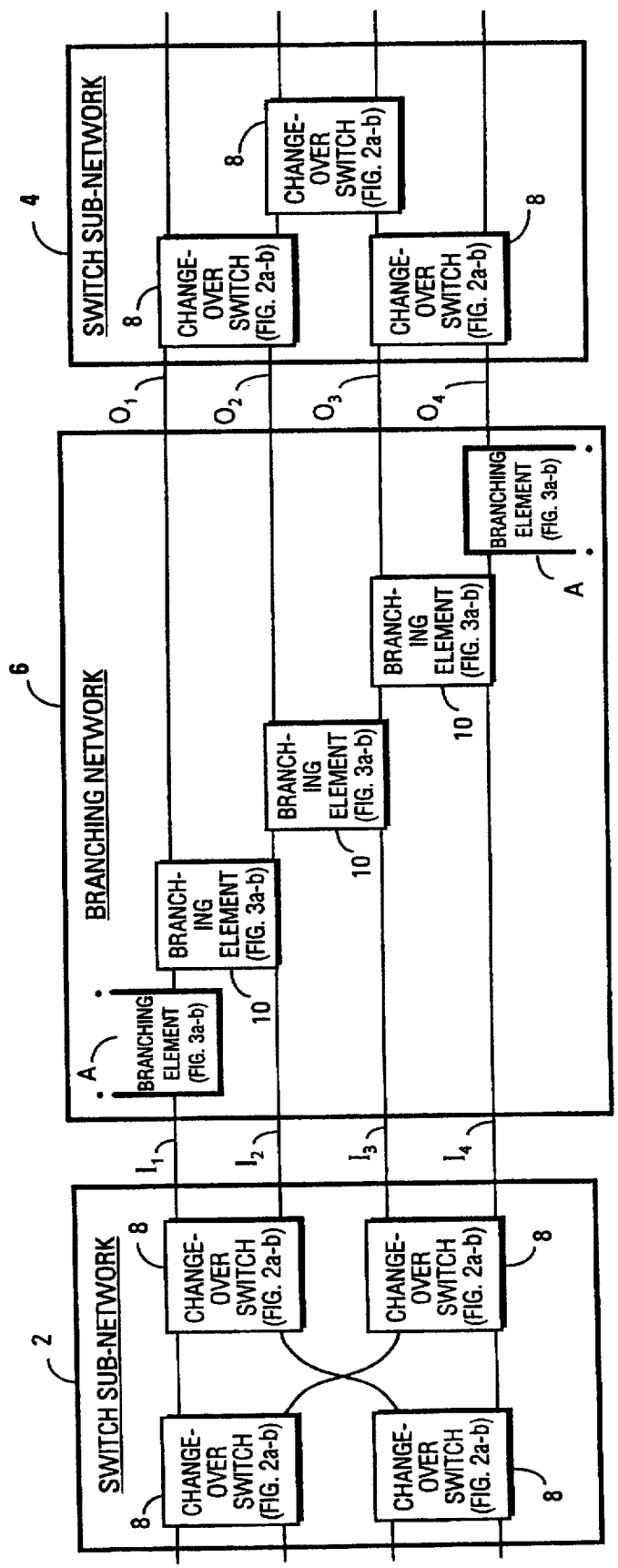

CHANGEOVER SWITCH

CHANGEOVER SWITCH

BRANCHING ELEMENT

BRANCHING ELEMENT

GENERALIZED CONNECTION NETWORK

BACKGROUND OF THE INVENTION

1. Field of the Invention

This invention relates to generalised connection networks of particular, but not exclusive, application to optical networks.

2. Related Art

Optical space switches can provide broadband switched connections in PBX and local network environments. Generalised connection networks (GCNs) offer the additional facility of broadcasting, for example, from any one of N inputs to any number up to N of outputs enabling any customer in a local network, for example to become a broadcast service provider to any combination of the other customers. The smallest GCNs published to date operate by separating the broadcast function into two parts; an initial replication network (generaliser) to generate the required number of copies, followed by a one-to-one switching network (connector) to connect the copies to the appropriate outputs. This segregated approach requires more crosspoint switches than the $N\log_2 N$ theoretically needed to provide all of the $N^N$ possible permutations. GCNs using make/break contacts require $5.8N\log_2 N$, and when using optical changeover switches they require in the order of $2N\log_2 N - N + 2$.

FIG. 2 of Sakata et al "Synthesis of Multiconnected Switching Networks, Electronics and Communications in Japan, vol. 58-A, no. 1, 51–58 (1975)", shows a GCN in which a branching network is positioned between a left-hand and a right-hand sub-network made up from two input, two output, 2-state branching elements whose task is either to allow both inputs through unaltered, or to copy one input, the upper input, to both outputs. In optics, where 2×2 changeover switches naturally perform a crossover function, their use as branching elements requires disconnection of the lower input line when copying, and this is easily provided by turning off the light source not seeking connection through the network or by adding a net of N additional on/off switches. A signal at a given input can be copied to a subset of outputs of the branching network as desired by passing sequentially through the switches in a downward direction. The right hand permutation network then interconnects the output of the branching network to the desired outputs of the GCN.

SUMMERY OF THE INVENTION

According to the present invention a generalised connection network comprises a first and a second interconnection sub-network interconnected by a branching network having N inputs and N outputs characterised in that the branching network has N, two-state branching elements interconnected so as to be able to replicate a signal coupled to any one of the N inputs to each of up to N outputs.

This is achieved by connecting N branching elements to provide a cyclic connection scheme (cylindrical symmetry) around the branching network which then permits any degree of branching, i.e. replication, of a signal on any one of the N inputs of the branching circuit because the branching elements form a complete cycle. This is in contrast to the previously mentioned Sakata et al arrangement which uses only N−1 branching elements which allows the $i^{th}$ input (where i=1 to N) to be replicated only (N−i) times.

The applicant has realised that the inclusion of the additional two state branching element in the branching network allows for a reduction by more than one two-state switch in the total number of two-state switches in the first and second sub-networks thereby achieving a net gain in terms of two state switching elements needed to form a generalised connection network. In particular an 8×8 GCN according to the present invention requires a second sub-network having only 12 two state switches in contrast to the 17 needed for the Sakata GCN.

It will be understood that each two-state branching element may be made up one or more simultaneously operated switch elements depending, for example, on the technology and switch topology chosen.

Each branching element may have two branching element inputs and two branching element outputs and be switchable between a first state in which each branching element output is coupled to a respective branching element input and a second state in which both branching element outputs are coupled to the same branching element input. These may be implemented as optical waveguide switches, for example.

Greater flexibility can be achieved in the branching network leading to further two-state switch reductions if each of the N inputs is coupled to a respective one of the N outputs by a guide and includes N branching element switchable between a first state in which an inputs coupled to either one of two guides replicated to the other of the two guides and a second state in which no replication occurs. That is, the branching network is configured to replicate signals in both directions, i.e. up as well as down.

In electrical technology, this may be easily achieved with make/break contacts for example. In optical technology this two-directional branching can be achieved by providing guides which comprise parallel integrated optics waveguides and the branching elements comprise electrodes which control coupling of an optical signal from one guide to another.

It has been shown that it is possible to have GCMs in which the two subnetworks have at most $N\log_2 N$, two-state switches.

BRIEF DESCRIPTION OF THE DRAWINGS

Embodiments of the invention will now be described, by way of example only, by reference to the drawings in which FIG. 1 is a schematic diagram of a 4×4 GCN according to the present invention employing a one-way branching network;

DESCRIPTION OF EXEMPLARY EMBODIMENTS

Referring to FIG. 1 a 4×4 GCN has a first and a second sub-network. 2 and 4, interconnected by a four-input, four-output branching network 6 having four inputs $I_1$–$I_4$ and four outputs $O_1$–$O_4$.

Figure 2A:
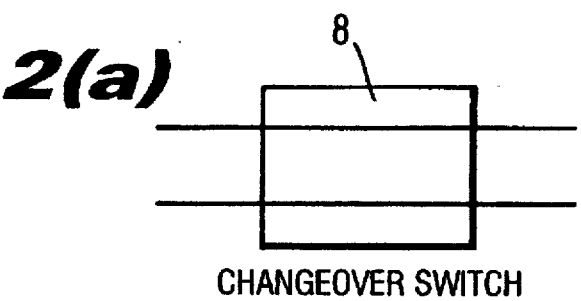
FIGS. 2(a) and 2(b) are schematic diagrams of the two states of the switching elements used in the FIG. 1 embodiment.
Figure 2B:
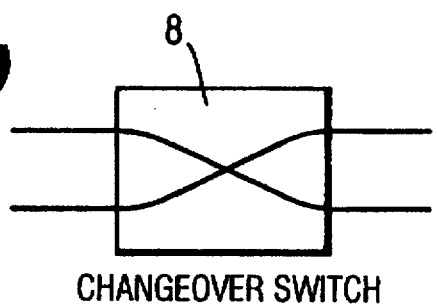

The sub-networks 2 and 4 are formed from 2×2 changeover switches 8 having the two states shown schematically in FIGS. 2(a) and 2(b) respectively, that is they allow signals on one input to be selectively coupled to either one of the outputs, the other input being coupled to the other output.

Figure 3A:
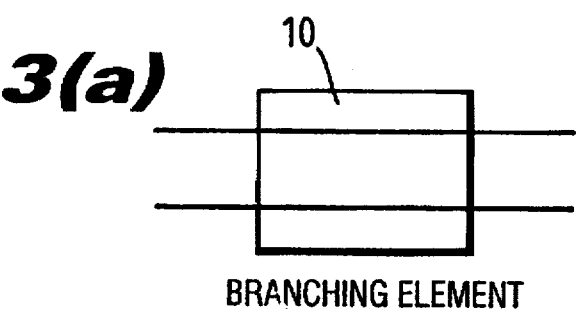
FIGS. 3(a) and 3(b) are schematic diagrams of the two states of the branching elements used in the FIG. 1 embodiment.
Figure 3B:
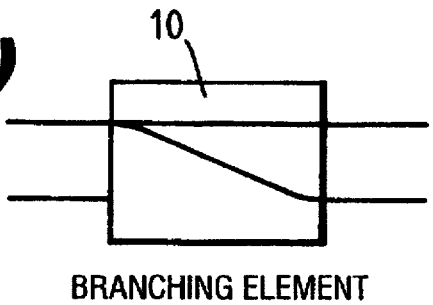

The branching network 6 is formed from four branching elements 10 each having two branching element inputs and two branching element outputs. The elements 10 have the two states shown schematically in FIGS. 3(a) and 3(b). That is, each branching element 10 either connects each output to a respective input or both outputs to the one of the inputs.

The present invention does not rely on the actual construction of the branching and switch elements to implement the two-state function. Any suitable implementation may be employed.

The branching network 6 is of the same type as the branching network of Sakata et al referenced earlier but includes the additional branching element A which provides replication of the signal from the bottom most output to the input of the top most branching element. This permits replication of the signal entering at any of the inputs $I_1$ to $I_4$ of the branching network 6 up to the maximum four copies at the outputs $O_1$ to $O_4$.

The 4×4 GCN of FIG. 1 is one of two networks that have been found by the applicant to provide all of the 256 possible connection permutations of a 4×4 broadcast network ($N^N$= $4^4$) within the 2,048 states of its 11 switches. The required switch states were obtained by manual inspection for each permutation. The network uses just 3 more switches than the theoretical minimum of $4\log_2 4=8$.

Figure 4:
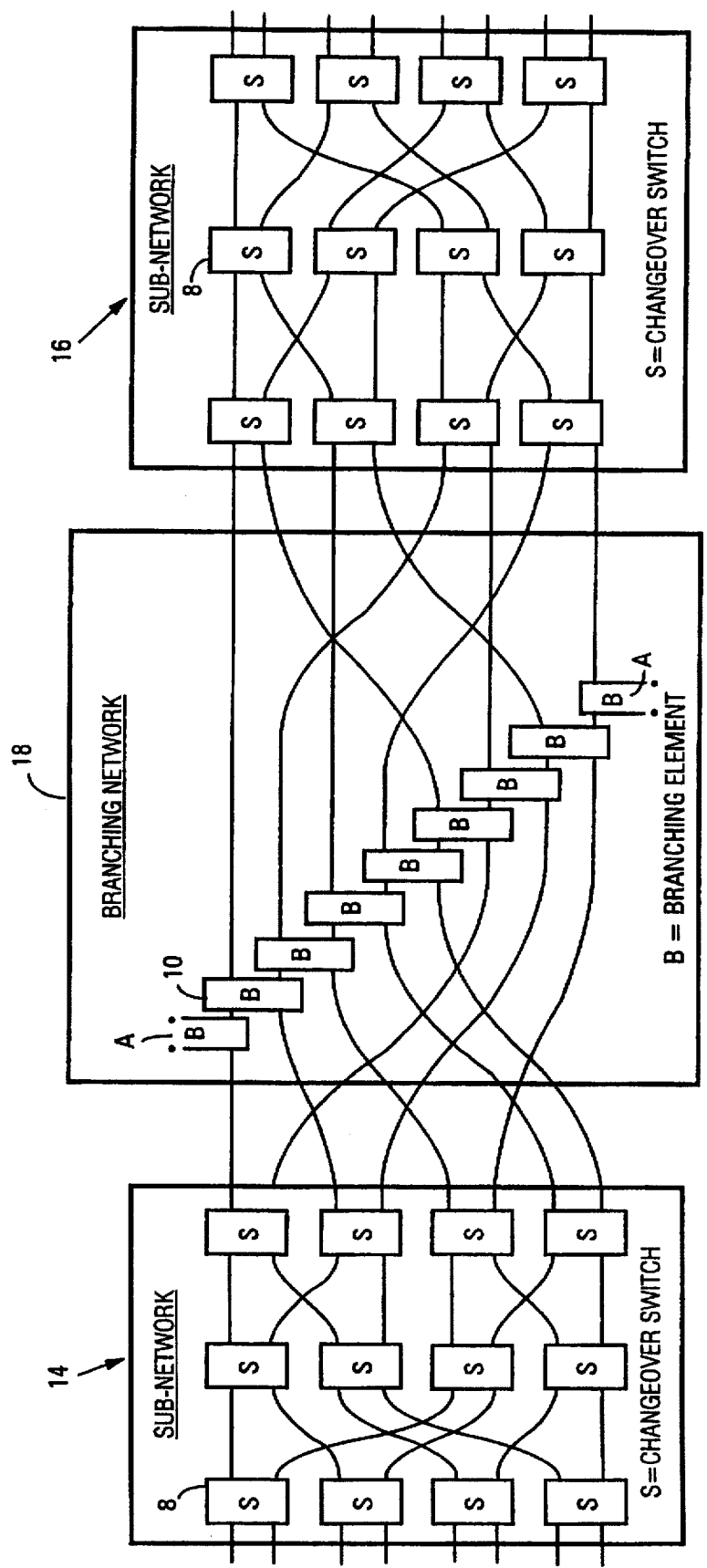
FIG. 4 is a schematic diagram of an 8×8 GCN according to the present invention employing a one-way branching network.

Referring now to FIG. 4, an 8×8 GCN according to the present invention comprises a first and a second sub-network 14 and 16 and a branching network 18 composed of switching elements 8 and branching elements 10, respectively, as used in the FIG. 1 4×4 GCN. Again, full cyclic replication of the inputs to the branching network 18 to its outputs is obtainable by means of the inclusion of the branching element A. In this embodiment the first and second sub-networks 14 and 16 together constitute a single permutation network (connector) having one more stage of switches than the minimum permutation networks of Goldstein and Leibholz, "On the synthesis of multiconnected switching networks", IEEE Trans 1967 2–29 (11) pp 1029–1032. This is one of the four networks that have been found capable of 8×8 broadcast switching with left and right-hand sub-networks each having $\log_2 N=3$, fully filled stages. All four networks employ the same number of two-state switches, but have slightly different link patterns between the first sub-network and the branching network.

In these 8×8 cases the number of connection permutations ($8^8$=16,777,216) made manual inspection impossible to obtain the switch states. Proof that all permutations could be satisfied was obtained instead by exhaustive computer search through all 4,294,967,296 states of the 32 switches. The 8×8 network of the present invention uses 8 more switches than the theoretical minimum of 24.

Figure 6:
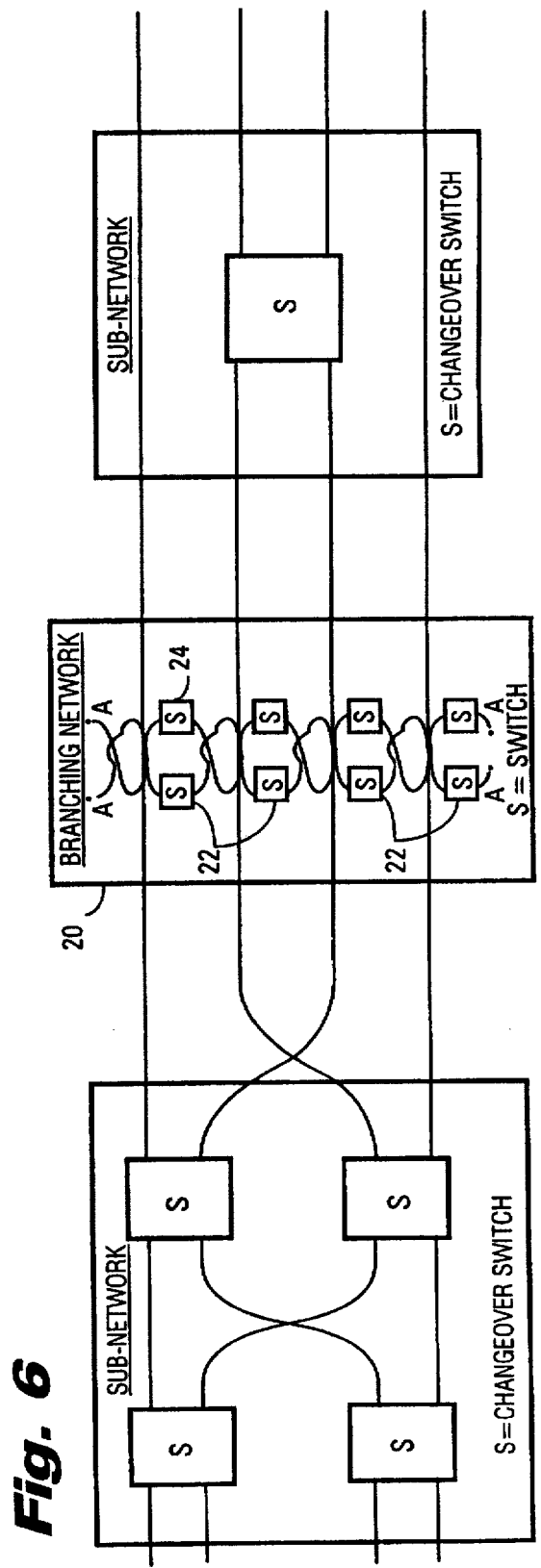
FIG. 6 is schematic diagram of a further embodiment of 4×4 GCN employing a two-way branching network.

Referring now to FIG. 6 an experimental 4×4 GCN has discrete optical components in a two-way branching network 20, to demonstrate the operation of the structure without requiring a special integrated-optic device to be fabricated. The branching network 20 consists of 3×3 single-mode fused-fibre couplers 22 which split the optical power from each input to the branching network 20, and 2×2 changeover switches 24 which act as on/off switches to control the upward and downward distribution of signals between the lines. (This discrete approach does however increase the number of switches but they still are two-state devices considered as a whole). The manually derived switch states were checked on the network, and all 256 permutations obtained.

Figure 5:
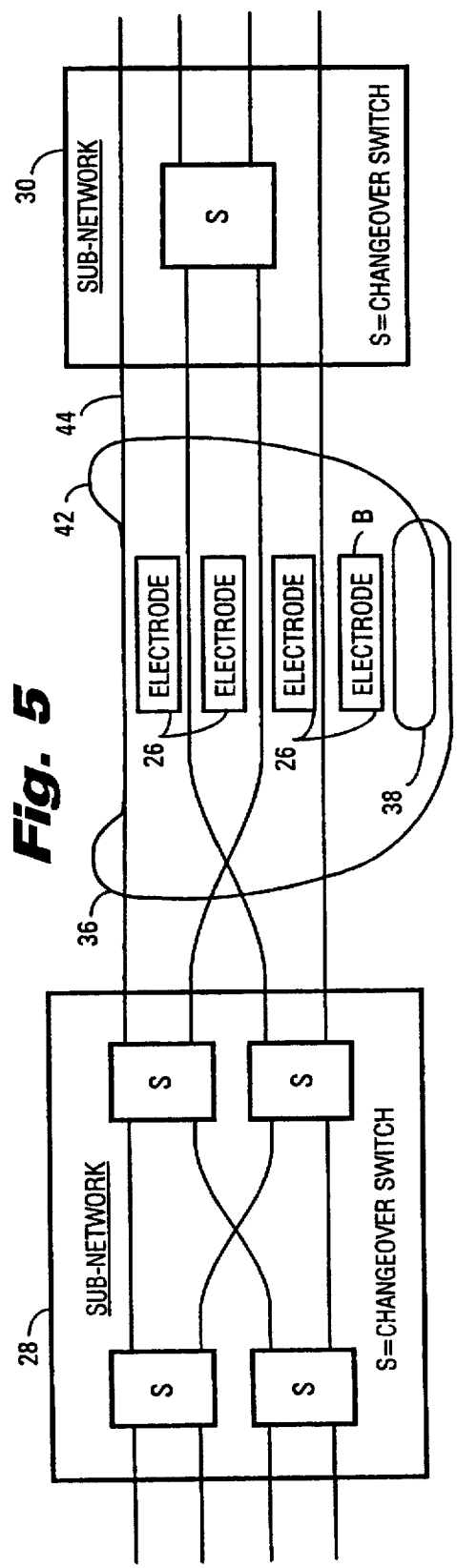
FIG. 5 is a schematic diagram of a 4×4 GCN according to the present invention employing a two-way branching network.

A further optical GCN network is shown in FIG. 5, which uses parallel integrated-optics waveguides throughout, with electrodes 26 for coupling light into adjacent waveguides in both directions, i.e. upwards and downwards.

The two-state switch B is formed as an electrode coupling to an additional waveguide 38. The cyclic nature is obtained in this case, by linking the waveguide 38 by optical fibre links 36 and 42 round to the waveguide 44 to which they are passively coupled.

Only 9, two-state switches are now required, which is just one more than the theoretical minimum. The first and second sub-networks 28 and 30 of the embodiment of FIG. 5, excluding the branching network, together constitute precisely one 4×4 minimal permutation network (connector), with no additional switches required at all.

Networks according to the present invention are equally applicable to technologies other than optical technologies, especially electronics where 2×2 changeover switches and branching elements and switches can be readily implemented using logic or analogue gates.

I claim:

1. A generalised connection network comprising:
   a first and a second interconnection sub-network interconnected by a branching network having N inputs and N outputs, N being an integer,
   the branching network having N two-state branching elements interconnected so as to be able simultaneously to replicate a signal coupled to any one of the N inputs to each of up to N outputs.

2. A network as in claim 1 in which each branching element has two branching element inputs and two branching element outputs and is switchable between a first state in which each branching element output is coupled to a respective branching element input and a second state in which both branching element outputs are coupled to the same branching element input.

3. A network as in claim 2 in which in the second state both the branching element inputs are coupled to both branching element outputs.

4. A network as in claim 1 in which each of the N inputs is coupled to a respective one of the N outputs by a guide and including N branching elements switchable between a first state in which an input coupled to either one of two guides is replicated to the other of the two guides and a second state in which no replication occurs.

5. A network as in any preceding claim in which the branching elements include optical waveguide switches.

6. A network as in claim 4 in which the guides comprise parallel integrated optics waveguides and the branching elements comprise electrodes which control coupling of an optical signal from one guide to another.

7. A network as in any preceding claim in which the total number of two state switches in the sub-networks is no more than $N\log_2 N$.

* * * * *